(12) United States Patent
Jung et al.

(10) Patent No.: US 8,055,253 B2
(45) Date of Patent: Nov. 8, 2011

(54) TRANSCEIVER DEVICE CAPABLE OF CALIBRATION AND CALIBRATION METHOD USED BY THE SAME

(75) Inventors: Weon-kyo Jung, Anyang-si (KR); Joong-suk Park, Seongnam-si (KR); Dae-yeon Kim, Suwon-si (KR); Hee-seung Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 622 days.

(21) Appl. No.: 11/327,511

(22) Filed: Jan. 9, 2006

(65) Prior Publication Data

US 2006/0160534 A1    Jul. 20, 2006

(30) Foreign Application Priority Data

Jan. 19, 2005 (KR) .................. 10-2005-0005003

(51) Int. Cl.
*H04W 24/00* (2009.01)
*H04M 1/00* (2006.01)
(52) U.S. Cl. .................... 455/423; 455/550.1
(58) Field of Classification Search ............... 455/67.1, 455/67.14, 75, 550.1, 553.1, 423; 370/350, 370/480, 328, 329; 375/135; 342/357.23, 342/357.73, 368, 377
See application file for complete search history.

(56) References Cited

U.S. PATENT DOCUMENTS

| | | | | |
|---|---|---|---|---|
| 5,748,669 A * | 5/1998 | Yada | ............... | 375/135 |
| 6,728,517 B2 * | 4/2004 | Sugar et al. | ............... | 455/73 |
| 7,119,606 B2 * | 10/2006 | Fahim | ............... | 327/541 |
| 2002/0181509 A1 * | 12/2002 | Mody et al. | ............... | 370/480 |
| 2003/0083016 A1 * | 5/2003 | Evans et al. | ............... | 455/67.1 |
| 2004/0048584 A1 * | 3/2004 | Vaidyanathan et al. | ...... | 455/103 |
| 2004/0106380 A1 | 6/2004 | Vassiliou et al. | | |
| 2006/0209978 A1 * | 9/2006 | Jungnickel et al. | ......... | 375/267 |

FOREIGN PATENT DOCUMENTS

| | | |
|---|---|---|
| CN | 1499857 A | 5/2004 |
| EP | 0412220 A1 | 2/1991 |
| JP | 2002-353865 A | 12/2002 |
| KR | 2002-0055387 A | 7/2002 |
| KR | 2002-0074783 A | 10/2002 |
| KR | 2003-0058265 A | 7/2003 |

OTHER PUBLICATIONS

Gyung-Wan Kim, Mun-Sun Kim, Hjng-Jun Yoo, "Analysis on RF Technology Trend for Wireless SoC," Wireless SoC, pp. 15-19.

* cited by examiner

*Primary Examiner* — George Eng
*Assistant Examiner* — Michael Faragalla
(74) *Attorney, Agent, or Firm* — Sughrue Mion, PLLC (57) ABSTRACT

A transceiver device capable of calibration, and a calibration method used by the transceiver device. The transceiver device includes a reference transceiver, a plurality of remaining transceivers, and a plurality of transmission calibration paths connecting the remaining transceivers to the reference transceiver for transmission calibration of the remaining transceivers. An envelope detector included in the reference transceiver is shared with the remaining transceivers. When implementing a multiple input multiple output (MIMO) transceiver in a single chip, the chip size and manufacturing cost of the MIMO transceiver device can be substantially reduced.

23 Claims, 4 Drawing Sheets

TRANSCEIVER DEVICE CAPABLE OF CALIBRATION AND CALIBRATION METHOD USED BY THE SAME

This application claims priority from Korean Patent Application No. 10-2005-0005003, filed on Jan. 19, 2005, in the Korean Intellectual Property Office, the disclosure of which is incorporated herein in its entirety by reference.

BACKGROUND OF THE INVENTION

1. Technical Field

The present invention relates to a transceiver device having a direct conversion structure and a calibration method used by the transceiver device.

2. Related Art

In the related art, wireless local area networks (WLANs) are an emerging application of wireless systems. Institute of Electrical and Electronics Engineers (IEEE) 802.11 is a WLAN standard. The 802.11b standard was the first to be commercialized, and the 802.11a standard was developed to address the new needs of the WLAN market. The 802.11a standard uses a frequency of 5 GHz and adopts orthogonal frequency division multiplexing (OFDM) as its modulation scheme. OFDM distributes data among a large number of carriers a predetermined distance apart from one another in a given frequency range. The predetermined distance provides "orthogonality," which prevents a demodulator from referring to frequencies other than its own frequency.

Related art direct conversion transceivers are a type of transceiver used in wireless systems such as the WLAN. The use of related art direct conversion transceivers is becoming widespread, since they can be implemented in a single-chip structure at a low cost by using a complementary metal oxide semiconductor (CMOS) technology. In addition, related art direct conversion transceiver problems, such as in-phase and quadrature (IQ) mismatch, local oscillator (LO) leakage, and DC offset, can be minimized in a calibration process by using a digital signal processor (DSP) or a microprocessor.

To achieve highly efficient data transmission, a related art transceiver device using a multiple input multiple output (MIMO) method that adopts a plurality of such direct conversion transceivers is being actively developed.

Figure 1:
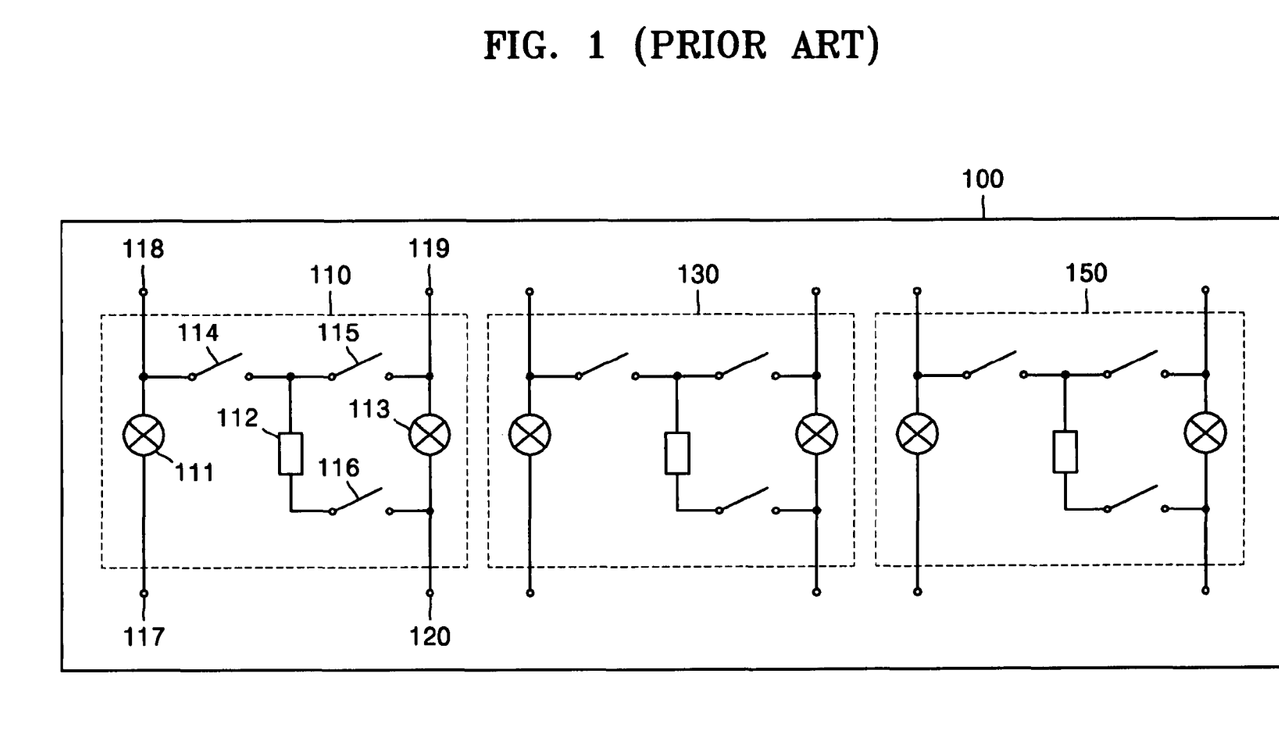
FIG. 1 is a schematic block diagram of a related art multiple input multiple output (MIMO) transceiver device.

FIG. 1 is a schematic block diagram of a related art MIMO transceiver device 100 that includes first through $n^{th}$ transceivers 110 through 150 having identical structures. The structure of the first transceiver 110 is described below as an example.

The first transceiver 110 includes an up-mixer 111, an envelope detector 112, a down-mixer 113, and a plurality of switches 114 through 116. The up-mixer 111 converts an input baseband signal into an RF signal and outputs the RF signal. The down-mixer 113 converts an input RF signal into a baseband signal and outputs the baseband signal. The envelope detector 112 detects and outputs the envelope of an input signal. The first through third switches 114 through 116 are for forming a plurality of calibration paths. Generally, the envelope detector 112 can be easily implemented using a diode.

Due to their structural characteristics, related art direct conversion transceivers suffer from IQ mismatch, LO leakage, DC offset, and so on. Ideally, the phase difference between an in-phase signal path and a quadrature signal path of a direct conversion transceiver must be 90 degrees, and the gain between the in-phase signal and the quadrature signal must be 0 dB. IQ mismatch occurs when these conditions for the phase difference between the in-phase signal path and the quadrature signal path and the gain are not met. More specifically, I refers to in-phase and Q refers to quadrature. IQ mismatch is caused mainly by imperfect performance of the up-mixer 111 and the down-mixer 113. Also, a major cause of LO leakage is imperfect performance of a local oscillator. Since elements of a direct conversion transceiver on a transmission or receiving path cannot perform ideally, DC offset is present in a baseband signal.

Calibration is required to minimize such related art problems as IQ mismatch. Usually, calibration is performed during the initialization of a transceiver device. A related art calibration process is described below with reference to the MIMO transceiver device 100 of FIG. 1.

Generally, calibration is divided into transmission calibration and receiving calibration. In the transmission calibration, after the first switch 116 and the second switch 114 are turned on and the third switch 115 is turned off, a test signal is transmitted to the up-mixer 111 through a baseband transmission port 117. The up-mixer 111 modulates the test signal to, for example, an RF signal having a high frequency of 5 GHz and outputs the RF signal. The RF signal is demodulated back to the baseband signal by the envelope detector 112 and output through a baseband receiving port 120. The baseband signal output from the baseband receiving port 120 is input to a DSP or a central processing unit (CPU). Based on the baseband signal, the DSP or the CPU carries out calibration of the transceiver device according to a predetermined calibration algorithm.

In the receiving calibration, after the second switch 114 and the third switch 115 are turned on and the first switch 116 is turned off, a test signal is transmitted to the up-mixer 111 through the baseband transmission port 117. The up-mixer 111 modulates the test signal to an RF signal having a high frequency and outputs the RF signal. The RF signal is down-converted back to the baseband signal by the down-mixer 113 and output through the baseband receiving port 120. As in the transmission calibration, the baseband signal output from the baseband receiving port 120 is input to the DSP or the CPU. Based on the baseband signal, the DSP or the CPU carries out calibration according to a predetermined calibration algorithm.

According to the related art, the up-mixer 111 on a transmission path is used in the receiving calibration. Thus, the transmission calibration must precede the receiving calibration. The same calibration process is performed on the second through $n^{th}$ transceivers 130 through 150.

For the calibration of the related art MIMO transceiver device 100, each of the first through $n^{th}$ transceivers 110 through 150 must include an envelope detector. Hence, when the transceiver device 100 is implemented in a single-chip structure, efficiency in the use of space cannot be achieved. In addition, in case of an asymmetric MIMO transceiver device which does not use one of a plurality of transmission paths, a transmission calibration must be performed, even on the non-used transmission path for a receiving calibration, thereby prolonging the overall calibration time.

SUMMARY OF THE INVENTION

The present invention provides an MIMO transceiver device, which can be implemented in a simple structure and at a low cost and improve calibration accuracy, and a calibration method used by the same.

According to an aspect of the present invention, there is provided a transceiver device having a direct conversion structure. The device includes: a reference transceiver; a plurality of remaining transceivers; and a plurality of transmission calibration paths connecting the remaining transceivers to the reference transceiver for transmission calibration of the remaining transceivers.

According to another aspect of the present invention, there is provided a calibration method used by a transceiver device comprising a reference transceiver and a plurality of remaining transceivers. The method includes: activating one of a plurality of transmission calibration paths connecting the remaining transceivers to the reference transceiver, the activated transmission calibration path corresponding to a transmission calibration path between a transceiver selected from the remaining transceivers for transmission calibration and the reference transceiver; transmitting a test signal to the selected transceiver; and performing the transmission calibration of the selected transceiver based on the test signal output through the activated transmission calibration path.

According to another aspect of the present invention, there is provided a calibration method used by a transceiver device comprising a reference transceiver and a plurality of remaining transceivers. The method includes: activating one of a plurality of receiving calibration paths connecting the remaining transceivers to the reference transceiver, the activated receiving calibration path corresponding to a receiving calibration path between a transceiver selected from the remaining transceivers for receiving calibration and the reference transceiver; transmitting a test signal to the reference transceiver; and performing the receiving calibration of the selected transceiver based on the test signal output through the activated receiving calibration path.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments are shown. The invention may, however, be embodied in many different forms and should not be construed as being limited to the embodiments set forth therein; rather, these exemplary embodiments are provided so that this disclosure will be thorough and complete, and will fully convey the concept of the invention to those skilled in the art. Like reference numerals in the drawings denote like elements, and thus their description will omitted.

Figure 2:
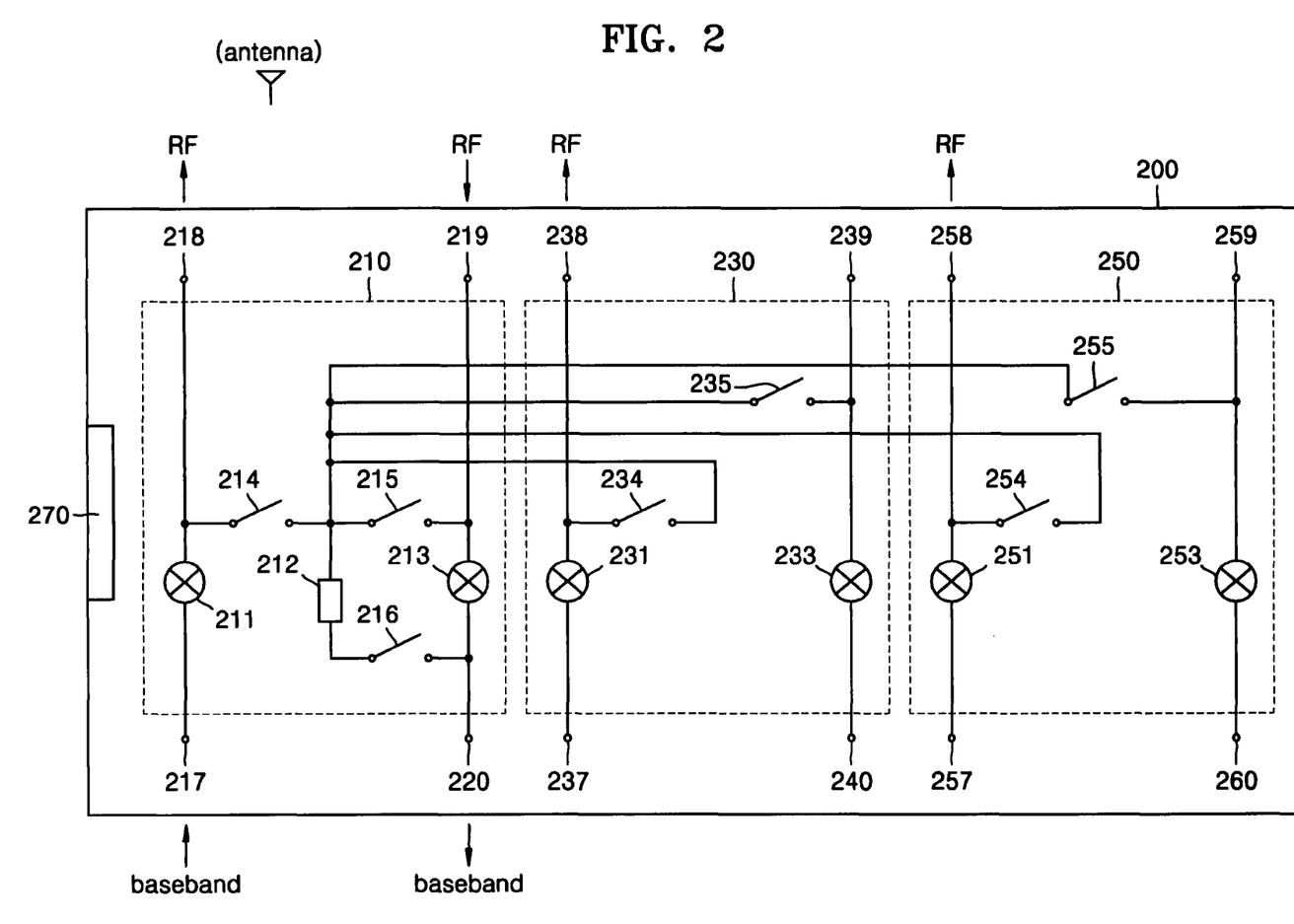
FIG. 2 is a block diagram of a MIMO transceiver device according to an exemplary embodiment of the present invention.

FIG. 2 is a block diagram of an MIMO transceiver device 200 according to an exemplary embodiment. The MIMO transceiver device 200 is a 3×3 symmetric transceiver device and includes a first transceiver 210, a second transceiver 230, a third transceiver 250, and a digital interface 270. The transceiver device 200 further includes transmission/receiving calibration paths between the first transceiver 210 and the second transceiver 230, and transmission/receiving calibration paths between the first transceiver 210 and the third transceiver 250.

At least one switch is present on each calibration path. Each calibration path is activated or deactivated by controlling the switches thereon. The switches on the calibration paths are controlled by a control signal output from the digital interface 270, which is input to the digital interface 270 from an external processor (not shown). Transmission/receiving calibration paths are also included in the first transceiver 210, and are activated or deactivated by switches 214 through 216.

The first transceiver 210 includes a baseband transmission port 217, an RF transmission port 218, an RF receiving port 219, and a baseband receiving port 220. The second transceiver 230 includes a baseband transmission port 237, an RF transmission port 238, an RF receiving port 239, and a baseband receiving port 240. The third transceiver 250 includes a baseband transmission port 257, an RF transmission port 258, an RF receiving port 259, and a baseband receiving port 260. The RF transmission port 218, the RF receiving port 219, the RF transmission port 238, the RF receiving port 239, the RF transmission port 258, and the RF receiving port 259 are connected to an antenna unit (not shown). The RF transmission ports 218, 238, and 258 transmit an RF signal to the antenna unit. An RF signal received by the antenna unit is input to the RF receiving ports 219, 239, and 259.

The baseband transmission port 217, the baseband receiving port 220, the baseband transmission port 237, the baseband receiving port 240, the baseband transmission port 257, and the baseband receiving port 260 are connected to a processor (not shown). The baseband transmission ports 217, 237, and 257 receive a baseband signal from the processor. The baseband receiving ports 220, 240, and 260 down-convert an RF signal received through the antenna unit into a baseband signal and transmit the baseband signal to the processor.

Generally, the transceiver device 200 of the exemplary embodiment is implemented in a complementary metal oxide semiconductor (CMOS) integrated circuit chip. However, those of ordinary skill in the art would understand that the transceiver device 200 may be implemented differently. All of the first transceiver 210, the second transceiver 230, and the third transceiver 250 of the exemplary embodiment are direct conversion transceivers.

The first transceiver 210 includes an up-mixer 211, an envelope detector 212, a down-mixer 213, and a plurality of switches 214, 215 and 216. The up-mixer 211 converts an input baseband signal into an RF signal and outputs the RF signal. The down-mixer 213 converts an RF signal into a baseband signal and outputs the baseband signal. The envelope detector 212 detects and outputs the envelope of an input signal. Generally, the envelope detector 112 can be easily implemented using a diode. The envelope detector 212 detects the envelope of the RF signal output from the up-mixer 211 during transmission calibration.

The second transceiver 230 includes an up-mixer 231 and a down-mixer 233. The third transceiver 250 includes an up-mixer 251 and a down-mixer 253. While the first transceiver 210 includes the envelope detector 212, the second transceiver 230 and the third transceiver 250 do not include envelope detectors for transmission calibration. According to an exemplary embodiment, the second transceiver 230 and the third transceiver 250 perform transmission calibration using the envelope detector 212 of the first transceiver 210.

A calibration method according to an exemplary embodiment is described below with reference to the structure of the transceiver device 200 of FIG. 2.

Usually, calibration is performed during the initialization of the transceiver device 200. However, if necessary, calibration may be performed during operation of the transceiver device 200.

If the first transceiver 210 including the envelope detector 212 is a reference transceiver, then when the transceiver device 200 is turned on, the transmission calibration of the first transceiver 210 (i.e., the reference transceiver) is performed before receiving calibration. The transmission and receiving calibrations of the first transceiver 210 are substantially the same as those of the related art first transceiver 110 illustrated in FIG. 1.

In the transmission calibration, after the switches 214 and 216 are transited on and the switch 215 is transited off, the transmission calibration path of the first transceiver 210 is activated. Then, a test signal is transmitted to the up-mixer 211 through the baseband transmission port 217. The up-mixer 211 modulates the test signal to, for example but not by way of limitation, an RF signal having a high frequency of 5 GHz and outputs the RF signal. The RF signal is demodulated back to the baseband signal by the envelope detector 212 and output through the baseband receiving port 220. The baseband signal output from the baseband receiving port 220 is input to a processor (not shown). Based on the received baseband signal, the processor calibrates the IQ mismatch, DC offset, or local oscillator (LO) leakage of the transceiver device 200 according to a predetermined calibration algorithm. Various related art calibration algorithms may be used and their detailed descriptions are omitted.

When the transmission calibration is terminated, the receiving calibration is performed under the control of the processor. In the receiving calibration, after the switches 214 and 215 are transited on and the switch 216 is transited off, the receiving calibration path of the first transceiver 210 is activated. Then, a test signal is transmitted to the up-mixer 211 through the baseband transmission port 217. The up-mixer 211 modulates the test signal to an RF signal having a high frequency and outputs the RF signal. The RF signal is down-converted back to the baseband signal by the down-mixer 213 and output through the baseband receiving port 220. As in the transmission calibration, the baseband signal output from the baseband receiving port 220 is input to the processor. Based on the received baseband signal, the processor carries out calibration according to a calibration algorithm. However, in the receiving calibration, only the IQ mismatch is calibrated.

After the transmission/receiving calibration of the first transceiver 210 (i.e., the reference transceiver) is finished, the transmission/receiving calibration of the second and third transceivers 230 and 250 is performed. In the case of the first transceiver 210, the transmission calibration is performed before the receiving calibration. However, in the case of the second and third transceivers 230 and 250, it is not necessary to perform the transmission calibration before the receiving calibration, because when the receiving calibration of the second and third transceivers 230 and 250 is performed, the receiving calibration path between the first transceiver 210 and the second transceiver 230 and the receiving calibration path between the first transceiver 210 and the third transceiver 250 are activated, and the transmission path of the calibrated first transceiver 210 is used.

Figure 3:
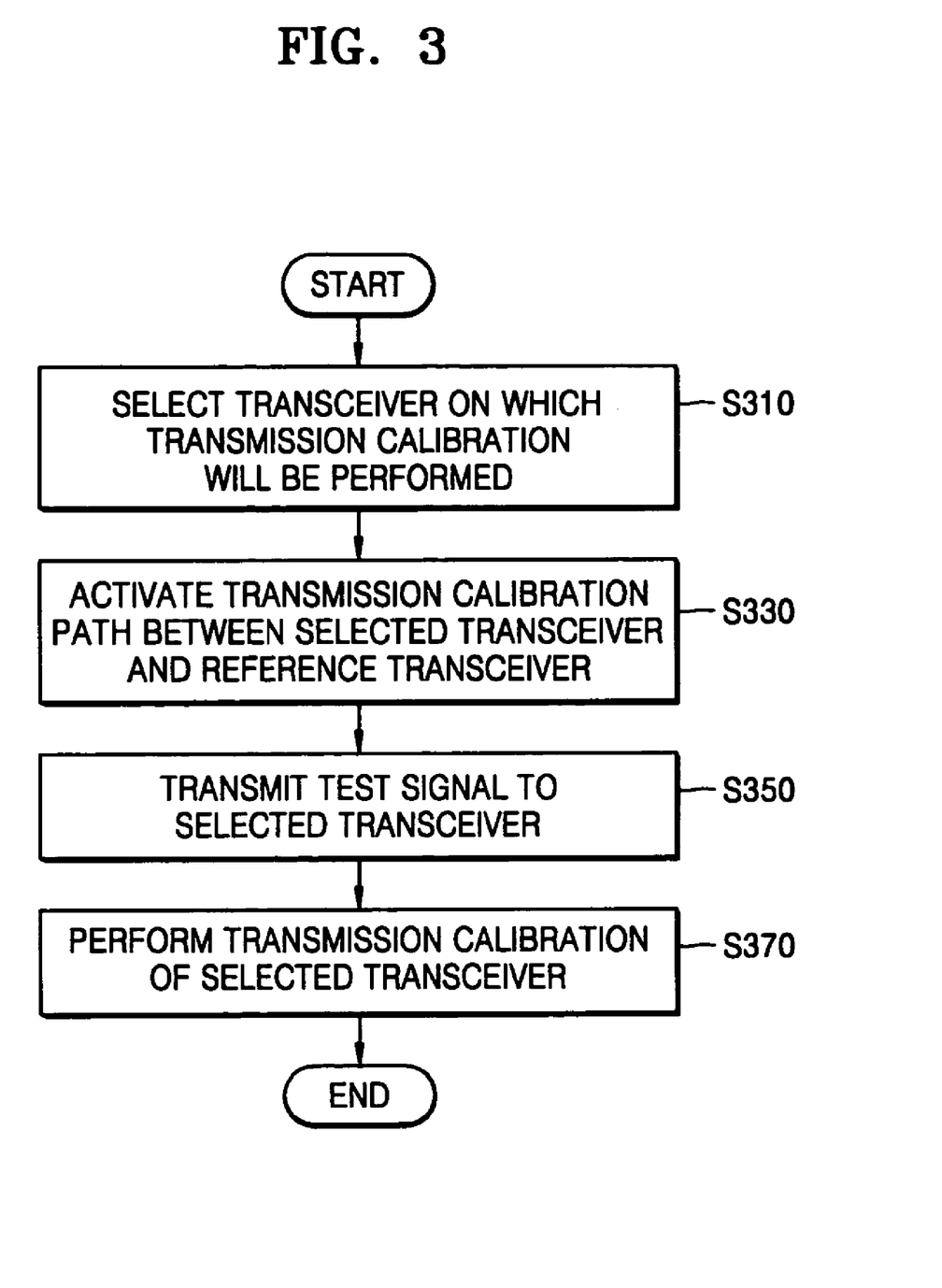
FIG. 3 is a flowchart illustrating a calibration method according to an exemplary embodiment of the present invention.

The transmission calibration of the second and third transceivers 230 and 250 is described with reference to FIG. 3, which is a flowchart illustrating the calibration method according to the exemplary embodiment. In particular, FIG. 3 illustrates a transmission calibration method of the second and third transceivers 230 and 250.

When a transceiver on which the transmission calibration will be performed is selected from the second and third transceivers 230 and 250 (S310), the processor activates a transmission calibration path connecting the selected transceiver to the first transceiver 210 (S330). If the second transceiver 230 is selected, the switches 234 and 216 are transited on and the remaining switches are transited off, thereby activating the transmission calibration path between the second transceiver 230 and the first transceiver 210.

Next, a baseband test signal is transmitted to the up-mixer 231 through the baseband transmission port 237 of the second transceiver 230. The transmitted test signal is modulated to an RF signal by the up-mixer 231, demodulated by the envelope detector 212 of the first transceiver 210, and output through the baseband receiving port 220 of the first transceiver 210. The baseband signal output through the baseband receiving port 220 is input to the processor. The processor performs the transmission calibration of the second transceiver 230 according to a calibration algorithm (S370). Specifically, the processor calibrates the IQ mismatch, DC offset, and LO leakage of the second transceiver 230.

If the third transceiver 250 is selected, the switches 254 and 216 are transited on and the remaining switches are turned off, thereby activating the transmission calibration path between the third and first transceivers 250 and 210. The subsequent processes are substantially similar to the transmission calibration of the second transceiver 230.

Figure 4:
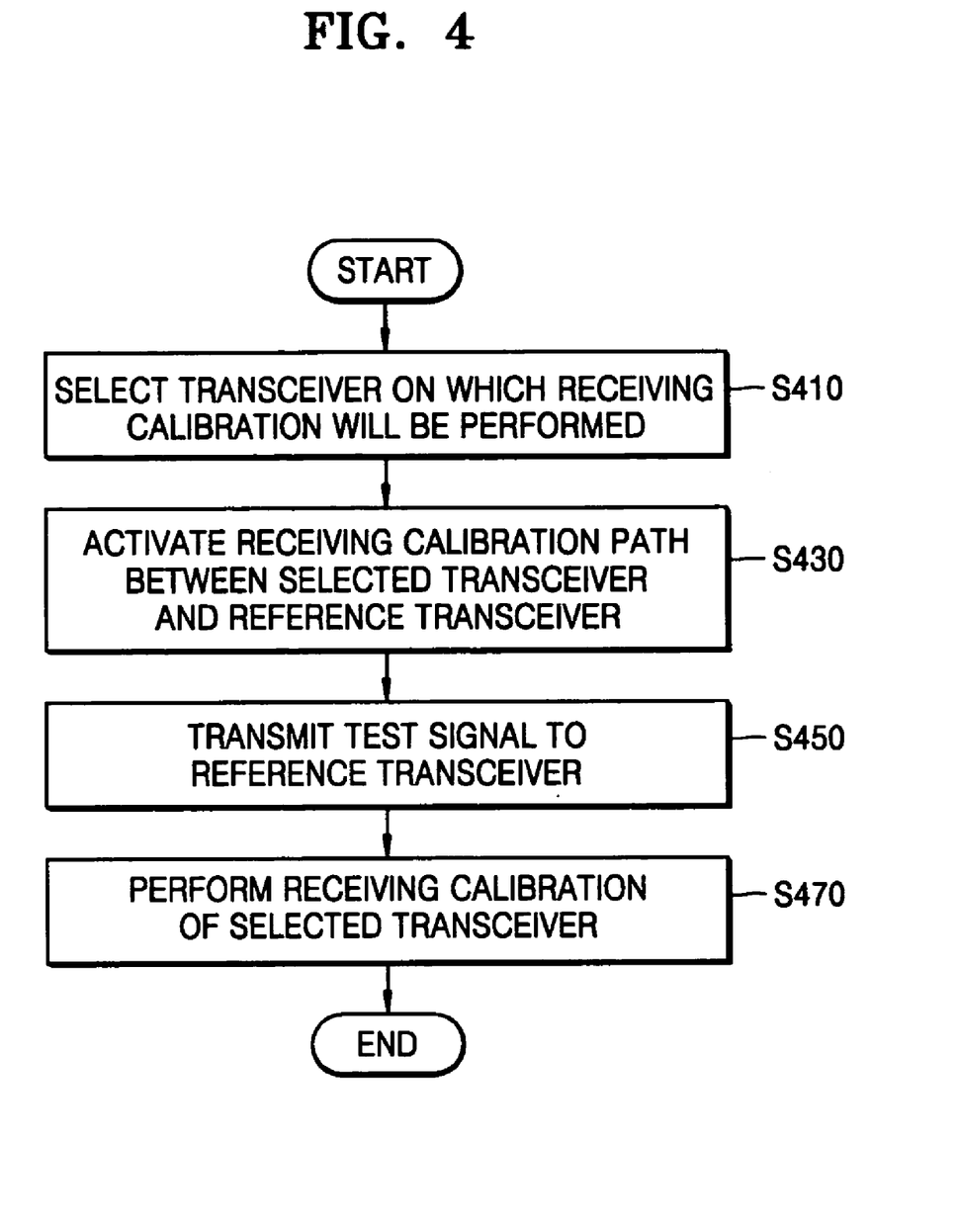
FIG. 4 is a flowchart illustrating a calibration method according to another exemplary embodiment of the present invention.

FIG. 4 is a flowchart illustrating a calibration method according to another exemplary embodiment. In particular, FIG. 4 illustrates a receiving calibration method of the second and third transceivers 230 and 250.

When a transceiver on which the receiving calibration will be performed is selected from the second and third transceivers 230 and 250 (S410), the processor activates a receiving calibration path connecting the selected transceiver to the first transceiver 210 (i.e., the reference transceiver) (S430). If the second transceiver 230 is selected, the switches 214 and 235 are transited on and the remaining switches are transited off, thereby activating the receiving calibration path between the second transceiver 230 and the first transceiver 210.

Next, a baseband test signal is transmitted to the up-mixer 211 through the baseband transmission port 217 of the first transceiver 210 (S450). The transmitted test signal is modulated to an RF signal by the up-mixer 211, demodulated to the baseband signal by the down-mixer 233 of the second transceiver 230, and output through the baseband receiving port 240 of the second transceiver 230. The baseband signal output through the baseband receiving port 240 is input to the processor. The processor performs the receiving calibration of the second transceiver 230 according to a calibration algorithm (S470). Specifically, the processor calibrates the IQ mismatch of the second transceiver 230.

If the third transceiver 250 is selected, the switches 214 and 255 are transited on and the remaining switches are transited off, thereby activating the receiving calibration path between the third and first transceivers 250 and 210. The subsequent processes are substantially similar to the receiving calibration of the second transceiver 230.

If the symmetric transceiver device 200 of FIG. 2 is a 2×3 asymmetric transceiver device, and thus does not use the RF transmission port 238, the transmission calibration of the second transceiver 230 is not required according to the exemplary embodiment, because the receiving calibration of the second transceiver 230 is performed using the up-mixer 211 of the first transceiver 210 on which the transmission calibration is performed.

Exemplary embodiments have been described using a 3×3 symmetric or 2×3 asymmetric transceiver device. The exemplary embodiment can also be applied to an N×N symmetric or (N−1)×N asymmetric transceiver.

As described above, according to the exemplary embodiments, an envelope detector included in a reference transceiver is shared with other transceivers. Therefore, when implementing a MIMO transceiver in a single chip, the chip size and manufacturing cost of the MIMO transceiver device can be substantially reduced. In the case of an asymmetric MIMO transceiver device, it is not necessary to perform transmission calibration on a transmission path that the asymmetric MIMO transceiver device does not use. Thus, the entire calibration time can be substantially shortened. Since a calibrated transmission path of the reference transceiver is used to perform receiving calibration on the remaining transceivers, the possibility of errors occurring during the receiving calibration of the remaining transceivers can be substantially reduced.

The exemplary embodiments can also be implemented as computer-readable code on a computer-readable recording medium. The computer-readable recording medium can be, e.g., any data storage device that can store data which can be thereafter read by a computer system. Examples of the computer-readable recording medium include (but are not limited to) read-only memory (ROM), random-access memory (RAM), CD-ROMs, magnetic tapes, floppy disks, and optical data storage devices.

The computer-readable recording medium can also be distributed over network-coupled computer systems, so that the computer-readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A transceiver device having a direct conversion structure, the device comprising:
   a reference transceiver;
   a plurality of remaining transceivers; and
   a plurality of transmission calibration paths connecting the reference transceiver and the plurality of remaining transceivers, wherein one of the plurality of transmission calibration paths is activated via controlling switches on the transmission calibration paths, the activated transmission path corresponding to a transmission calibration path between a transceiver selected from the plurality of remaining transceivers for transmission calibration and the reference transceiver,
   wherein the reference transceiver includes an envelope detector for transmission calibration, and the plurality of remaining transceivers do not include envelope detectors for the transmission calibration,
   wherein a test signal is transmitted to the selected transceiver and the transmission calibration of the selected transceiver is performed base on the test signal output through the activated transmission calibration path, and the transmission calibration comprises adjustment of a transmission frequency of a transceiver being calibrated.

2. The device of claim 1, further comprising a plurality of receiving calibration paths between the reference transceiver and the plurality of remaining transceivers, wherein each of the plurality of receiving calibration paths is configured to perform receiving calibration of the corresponding remaining transceiver of the plurality of remaining transceivers,
   wherein the receiving calibration comprises adjustment of a receiving frequency of a transceiver being calibrated.

3. The device of claim 2, wherein one of the receiving calibration paths is activated by a processor connected to the transceiver device, for the receiving calibration of one of the remaining transceivers.

4. The device of claim 2, wherein the receiving calibration paths are activated to measure IQ mismatch only.

5. The device of claim 1, wherein the reference transceiver comprises:
   a first up-mixer configured to convert a baseband signal into an RF signal; and
   the envelope detector configured to detect an envelope of the RF signal output from the first up-mixer for the transmission calibration, and
   each of the plurality of remaining transceivers comprises a respective second up-mixer configured to convert a corresponding baseband signal into a corresponding RF signal,
   wherein the transmission calibration paths connect the second up-mixers of the plurality of remaining transceivers to the envelope detector of the reference transceiver.

6. The device of claim 5, further comprising a plurality of receiving calibration paths between the reference transceiver and the plurality of remaining transceivers, wherein each of the plurality of receiving calibration paths is configured to perform receiving calibration of a corresponding remaining transceiver of the plurality of remaining transceivers,
   wherein the receiving calibration comprises adjustment of a receiving frequency of the corresponding remaining transceiver.

7. A transceiver device having a direct conversion structure, the device comprising:
   a reference transceiver;
   a plurality of remaining transceivers; and
   a plurality of transmission calibration paths between the reference transceiver and the plurality of remaining transceivers, wherein each of the plurality of transmission paths is configured to perform transmission calibration of a corresponding remaining transceiver of the plurality of remaining transceivers, and the transmission calibration comprises adjustment of a transmission frequency of the corresponding remaining transceiver,
   wherein the reference transceiver comprises:
   a first up-mixer configured to convert a baseband signal into an RF signal; and
   an envelope detector configured to detect an envelope of the RF signal output from the first up-mixer for the transmission calibration, and
   each of the plurality of remaining transceivers comprises a respective second up-mixer configured to convert a corresponding baseband signal into a corresponding RF signal,
   wherein the transmission calibration paths connect the second up-mixers of the plurality of remaining transceivers to the envelope detector of the reference transceiver,
   wherein the transceiver device further comprises a plurality of receiving calibration paths between the reference transceiver and the plurality of remaining transceivers, wherein each of the plurality of receiving calibration paths is configured to perform receiving calibration of a corresponding remaining transceiver of the plurality of remaining transceivers, wherein the receiving calibration comprises adjustment of a receiving frequency of the corresponding remaining transceiver, wherein each of the corresponding remaining transceiver of the plurality of remaining transceivers comprises a down-mixer configured to convert the corresponding RF signal into the baseband signal, and the receiving calibration paths connect the down-mixers of the corresponding remaining transceiver of the plurality of remaining transceivers to the first up-mixer of the reference transceiver.

8. The device of claim 1, wherein one of the transmission calibration paths is activated by a processor connected to the transceiver device configured for the transmission calibration of the corresponding remaining transceiver of the plurality of remaining transceivers.

9. The device of claim 1, wherein the reference transceiver and the plurality of remaining transceivers comprise direct conversion transceivers.

10. The device of claim 1, wherein the transceiver device comprises a complementary metal oxide semiconductor integrated circuit chip.

11. A calibration method used by a transceiver device comprising a reference transceiver and a plurality of remaining transceivers, the method comprising:
    activating one of a plurality of transmission calibration paths connecting the remaining transceivers to the reference transceiver via controlling switches on the transmission calibration paths, the activated transmission calibration path corresponding to a transmission calibration path between a transceiver selected from the remaining transceivers for transmission calibration and the reference transceiver;
    wherein the reference transceiver includes an envelope detector for the transmission calibration, and the plurality of remaining transceivers do not include envelope detectors for the transmission calibration,
    wherein the envelope detector included in the reference transceiver is shared by the plurality of remaining transceivers for the transmission calibration;
transmitting a test signal to the selected transceiver; and
performing the transmission calibration of the selected transceiver based on the test signal output through the activated transmission calibration path,
wherein the transmission calibration comprises adjustment of a transmission frequency of a transceiver being calibrated.

12. The method of claim 11, wherein the transmission calibration paths connect respective up-mixers of the remaining transceivers to the envelope detector of the reference transceiver.

13. The method of claim 11, wherein the transmission calibration path between the selected transceiver and the reference transceiver is activated by a processor coupled to the transceiver device.

14. The method of claim 11, wherein the reference transceiver and the remaining transceivers are direct conversion transceivers.

15. The method of claim 11, wherein the transceiver device comprises a complementary metal oxide semiconductor integrated circuit chip.

16. A calibration method used by a transceiver device comprising a reference transceiver and a plurality of remaining transceivers, the method comprising:
    activating one of a plurality of receiving calibration paths connecting the remaining transceivers to the reference transceiver, the activated receiving calibration path corresponding to a receiving calibration path between a transceiver selected from the remaining transceivers for receiving calibration and the reference transceiver;
    transmitting a test signal to the reference transceiver;
    performing the receiving calibration of the selected transceiver based on the test signal output through the activated receiving calibration path,
    wherein the receiving calibration comprises adjustment of a receiving frequency of a transceiver being calibrated;
    activating one of a plurality of transmission calibration paths connecting the remaining transceivers to the reference transceiver via controlling switches on the transmission calibration paths, the activated transmission calibration path corresponding to a transmission calibration path between a transceiver selected from the remaining transceivers for transmission calibration and the reference transceiver;
    wherein the reference transceiver includes an envelope detector for the transmission calibration, and the plurality of remaining transceivers do not include envelope detectors for the transmission calibration,
    wherein the envelope detector included in the reference transceiver is shared by the plurality of remaining transceivers for the transmission calibration;
transmitting a transmission test signal to the selected transceiver; and
performing the transmission calibration of the selected transceiver based on the transmission test signal output through the activated transmission calibration path,
    wherein the transmission calibration comprises adjustment of a transmission frequency of a transceiver selected for the transmission calibration.

17. The method of claim 16, wherein the receiving calibration paths connect respective down-mixers of the remaining transceivers to an up-mixer of the reference transceiver.

18. The method of claim 16, wherein the receiving calibration path between the selected transceiver and the reference transceiver is activated by a processor coupled to the transceiver device.

19. The method of claim 16, wherein the reference transceiver and the remaining transceivers are direct conversion transceivers.

20. The method of claim 16, wherein the receiving calibration paths are activated to measure IQ mismatch only.

21. The method of claim 16, wherein the transceiver device comprises a complementary metal oxide semiconductor integrated circuit chip.

22. A non-transitory computer-readable recording medium storing a program for executing a calibration method used by a transceiver device comprising a reference transceiver and a plurality of remaining transceivers, the method comprising:
    activating one of a plurality of transmission calibration paths connecting the remaining transceivers to the reference transceiver via controlling switches on the transmission calibration paths, the activated transmission calibration path corresponding to a transmission calibration path between a transceiver selected from the remaining transceivers for transmission calibration and the reference transceiver,
    wherein the reference transceiver includes an envelope detector for the transmission calibration, and the plurality of remaining transceivers do not include envelope detectors for the transmission calibration,
    wherein the envelope detector included in the reference transceiver is shared by the plurality of remaining transceivers for the transmission calibration;
    transmitting a test signal to the selected transceiver; and performing the transmission calibration of the selected transceiver based on the test signal output through the activated transmission calibration path, wherein the transmission calibration comprises adjustment of a transmission frequency of a transceiver being calibrated.

23. A non-transitory computer-readable recording medium storing a program for executing a calibration method used by a transceiver device comprising a reference transceiver and a plurality of remaining transceivers, the method comprising:

activating one of a plurality of receiving calibration paths connecting the remaining transceivers to the reference transceiver, the activated receiving calibration path corresponding to a receiving calibration path between a transceiver selected from the remaining transceivers for receiving calibration and the reference transceiver;

transmitting a test signal to the reference transceiver; and performing the receiving calibration of the selected transceiver based on the test signal output through the activated receiving calibration path, wherein the receiving calibration comprises adjustment of a receiving frequency of a transceiver being calibrated;

activating one of a plurality of transmission calibration paths connecting the remaining transceivers to the reference transceiver via controlling switches on the transmission calibration paths, the activated transmission calibration path corresponding to a transmission calibration path between a transceiver selected from the remaining transceivers for transmission calibration and the reference transceiver;

wherein the reference transceiver includes an envelope detector for the transmission calibration, and the plurality of remaining transceivers do not include envelope detectors for the transmission calibration, wherein the envelope detector included in the reference transceiver is shared by the plurality of remaining transceivers for the transmission calibration;

transmitting a transmission test signal to the selected transceiver; and performing the transmission calibration of the selected transceiver based on the transmission test signal output through the activated transmission calibration path, wherein the transmission calibration comprises adjustment of a transmission frequency of a transceiver selected for the transmission calibration.

* * * * *